May 25, 1954     E. CHAPPEL     2,679,571
TIP WELDER TOOL

Filed Nov. 12, 1952

*INVENTOR.*
EUGENE CHAPPEL

BY *Woodling and Krost*
            *attys*

Patented May 25, 1954

2,679,571

UNITED STATES PATENT OFFICE 2,679,571

TIP WELDER TOOL

Eugene Chappel, Whitesboro, N. Y., assignor to Utica Drop Forge & Tool Corporation, a corporation of New York Application November 12, 1952, Serial No. 319,869

1 Claim. (Cl. 219—8)

This invention relates in general to electrical arc welding of conducting members, and relates more specifically to the apparatus for successfully uniting such members with certain regularity.

An object of this invention is to provide an improved method of tip welding two conducting members together.

Another object of this invention is to provide for accurate control of welding energy applied to weld conducting members.

Another object of this invention is to provide improved apparatus for applying a correct amount of welding energy in the most advantageous manner.

Still another object of this invention is to adapt the welding method and principle to a practical portable tool for uniting members which cannot be brought to a fixed-position production machine.

Other objects and a fuller understanding of the invention may be had by referring to the following description and claim, taken in conjunction with the accompanying drawings, in which:

Figure 1:
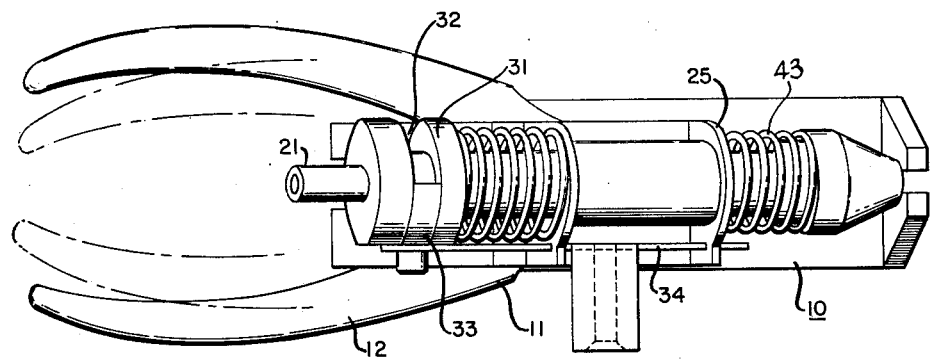
Figure 1 is a top plan view of a hand power portable tip welding tool embodying the principles of the invention.
Figure 3:
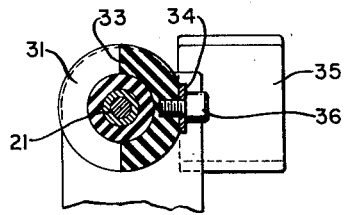
Figure 3 is a sectional view taken along line 3—3 of Figure 2.
Figure 4:
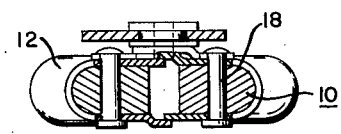
Figure 4 is a sectional view taken along line 4—4 of Figure 2.

The electrical union of two or more conducting members has been essential since the first adaptation of electricity to practical purposes. In some instances a simple mechanical union between the conducting members is satisfactory. Practically the only such union acceptable today is the attachment of a household lighting fixture to the supply circuit. The second, and practically universally accepted, method is to join electrical conducting members by soldering.

In recent years, however, aluminum has been widely adopted as an electrical conductor. It is well known that aluminum is difficult to unite or to join to other types of metal by a soldering or brazing process. In an effort to effectively unite aluminum wires or unite aluminum to other conducting metals, electrical welding of both the arc and resistance type has been resorted to.

The electrical arc welding of aluminum members, or of an aluminum member to other types of conducting members, has been only moderately successful because uniformity in the application of the welding energy has never been accomplished. A successful weld in one effort would not assure a continuous production of successful welds. Overheating or underheating, holding an arc for too long a period or too short a period, striking or extinguishing the arc too soon, and similar frailties have plagued the attempt to produce continuous tip welding unions.

According to this invention, the weldable members are held in close proximity and grounded. An electrode member of opposite polarity is then rapidly advanced toward the area of the conducting members to be united. An arc is produced between the electrode and the weldable members and causes the weldable members to rapidly rise to the melting point and begin to melt. If the welding potential is sufficiently great, then melting will be rapid enough to cause the weldable members to melt into a ball and recede before the face of the advancing electrode. This receding action will be fast enough to increase the distance between the weldable members and the electrode member beyond the arcing distance and, consequently, will extinguish the arc. Formed conducting members will retract as they melt because a spherical form will contain more material for a given surface than the shaped article. Consequently, when the weldable members are supported in mid-air and caused to melt, they will form into a globule and, therefore, will recede from the electrode. Control of the application of the welding energy is thus achieved by permitting the weldable members to recede from the electrode and thereby break the arc after a sufficient quantity of the conducting members has melted to provide a good electrical union. In some cases, a very small globule of weld may be desirable. In that case, the electrode itself may be caused to recede after the arc is struck to hasten the extinguishing of the arc, or the workpieces may be carried away from the electrode.

Although this invention was made with aluminum in mind, it has been found to operate with copper and other metals a well as, if not better than, aluminum.

Figure 5:
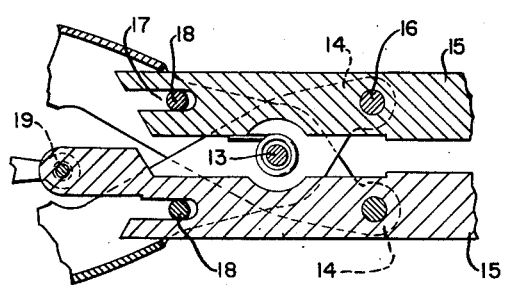
Figure 5 is a sectional view taken along line 5—5 of Figure 2.
Figure 6:
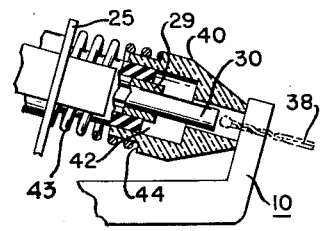
Figure 6 is a partial view, showing the welding area only, similar to the corresponding portion of Figure 2, but with the electrode advanced to its forward limit and a weld completed.

The preferred embodiment of a hand power portable tip welding tool embodying the principles of this invention is indicated generally by the reference character 10. This tool embodies a plier-like work gripping and holding member comprising a plier type vice 11 and pivoted hand grip handles 12. As best illustrated in Figure 5 of the drawings, the handles 12 are pivoted about a pivot 13. Each handle 12 has a finger portion 14 extending beyond the pivot 13. Two electrically conductive jaws 15 are pivotally interconnected with the fingers 14 by means of pivots 16. The jaws 15 are slotted, as indicated by the reference character 17, and pins 18 carried by the handles 12 rearwardly of pivot 13 extend into the slot 17. The mechanical movement produced by the pivot construction illustrated in Figure 5 can now be readily visualized. The jaws 15 will be moved laterally with respect to one another in subtantially a rectilinear lateral clamping movement, although actually they move forward somewhat as they close. A coiled spring 20 around the pivot 13 will urge the jaws 15 to an open position. It is not essential to the construction of the improved tool of this invention and to the operation of the improved welding process that a rectilinear type movement be employed, but this movement is believed to be desirable for most efficient clamping of various sizes and shapes of weldable workpieces. A terminal end 19 on one of the jaws 15 provides a convenient connection for impressing voltage of a predetermined polarity upon the vice 11.

As previously discussed, for the production of a perfect weld in every instance and for the control of the welding current by the actual welding process itself rather than by some mechanical or human controlled contrivance, it is preferred that the electrode be moved toward the weldable work members through a definite path and be stopped short of actual contact with the vice holding the work members in order that the welding process can proceed and draw the workpieces away from the electrode to break the welding operation. In the illustrated embodiment of the improved tool for thus positioning the electrode, a bracket 25 is joined with the work gripping portion of the tool into a unitary structure. Specifically, the bracket 25 is mounted upon an extension of the pivot 13. Other suitable means can be provided for mounting the bracket 25, if desired. A guide tube 27 is carried by the bracket 25 with the longitudinal axis of the guide tube 27 directed toward the work gripping ends of the jaws 15. An insulating housing 28 is mounted within the guide tube 27 and is free to reciprocate longitudinally therein. The housing 28 has a collet grip 29 mounted therein to hold a carbon electrode member 30. Thus, the carbon electrode 30 may be replaced when it becomes pitted and worn. An electrically conducting wire 21 is connected to the electrode 30 and extends out of the rearward portion of the housing 28. Thus, voltage potential of polarity opposite to that imposed upon jaws 15 through terminal 19 will produce a welding circuit.

An end flange 31 is secured to the rearward end of the housing 28 and serves as a driving interconnection to longitudinally reciprocate the housing and electrode. A spring 37 is mounted over the housing 28 between the bracket 25 and the flange 31 to urge the housing and electrode to a retracted position with respect to the jaws 15. The flange 31 has an annular groove 32 therein. A segment key 33 is positioned within the groove 32. A longitudinally slidable slide member 34 is guided through suitable slots in the side of the bracket 25 and is secured to the segment key 33 by means of a screw 36. A suitable knob 35 adapted to be contacted by the thumb of the operator is secured to the slide 34 between the upright portions of bracket 25.

Figure 2:
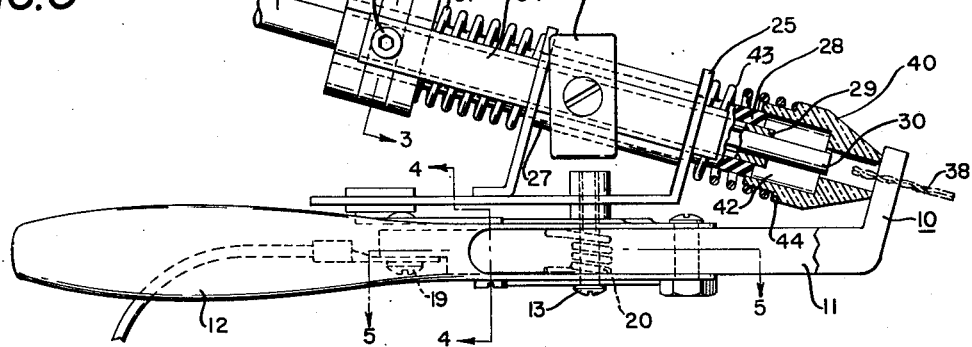
Figure 2 is a side elevation, partially in section, of the tool of Figure 1.

In operation, therefore, the improved tool of this invention may be gripped in one hand of the operator much in the same manner as a pair of pliers. Weldable workpiece members, illustrated in the drawing as a pair of twisted wires 38, are grasped by the ends of the jaws 15 substantially as illustrated in Figure 2 of the drawings. Clamping of the wires 38 in the jaws 15 is accomplished in the usual manner by compressing the handles 12 and causing the jaws 15 to move together as described. Thereafter the operator may use his thumb on the knob 35 to advance the slide 34, consequently, causing the flange 31 to compress the spring 37 and advance the housing 28 and electrode 30. The knob 35 will contact the forward portion of bracket 25 and produce a definite stop position limiting the approach of the electrode member to a predetermined relative position with respect to the jaws. The exact adjustment of the final stop position for the electrode 30 can readily be altered by changing its position within the collet 29.

Although not essential for the production of a weld, it has been found to be very desirable to have a shield member surround the welding area to prevent free access of air to the molten metal and to prevent splattering, eye damage by radiation, and similar well-known detrimental effects caused by an exposed welding operation. The molten metal and the arc will use the oxygen within the housing and produce an oxygen lean atmosphere to retard oxidation of the weld until cooled.

However, a shield is generally a cumbersome device and undesirable. In the embodiment of the invention illustrated, an improved shield construction is illustrated embodying a shield member 40 having a bore 42 to slidably fit upon the end of the insulating housing 28. A spring 43 between bracket 25 and a shoulder portion 44 urges the shield to an advanced position with respect to the electrode 30. A convenient amount of overlap and a suitable stop member may be provided to prevent the shield being advanced completely off the end of housing 28. With the construction thus set forth, the housing will advance around the wires 38 and then the electrode 30 will advance within the housing until the electrode produces an arc with the workpieces. Thereupon, the arc will cause a substantially instantaneous melting of the workpieces. As the workpieces melt, they will form into a globule having a larger surface area per unit of volume than the original form thereof, and consequently the workpiece members will retract before the electrode and prevent actual contact therewith. As the electrode finally comes to the stop position as described, the work members will continue to melt away from the end of the electrode until finally a distance is reached wherein the arc is extinguished and the welding operation brought to a conclusion. This entire welding process has been timed at approximately one-thirtieth of one second.

The improved tool as thus described has proven successful in the production of perfect welds repeatedly without the production of improperly melted weldable members and without the welding of the electrode to the workpieces by improper manual manipulation.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A portable tip welding tool comprising, a plier-like work gripping and holding member having electrically conductive jaws, electrode means including a guide sleeve, bracket means carrier by said work gripping member, said sleeve mounted by said bracket with the longitudinal axis thereof directed toward the said jaws, a longitudinally reciprocable electrode mounted in said guide sleeve, drive means adapted for advancing said electrode toward said jaws, means urging said electrode away from said jaws, means limiting the approach of said electrode member to a predetermined relative position with respect to said jaws, and means for impressing a voltage between said jaws and electrode member.

References Cited in the file of this patent

UNITED STATES PATENTS

| Number | Name | Date |
|---|---|---|
| 1,897,606 | Cole | Feb. 14, 1933 |
| 2,139,499 | Hawie | Dec. 6, 1938 |
| 2,434,025 | Wallace | Jan. 6, 1948 |
| 2,442,423 | Lomax | June 1, 1948 |